United States Patent [19]

Sugimori et al.

[11] Patent Number: 4,977,241

[45] Date of Patent: Dec. 11, 1990

[54] PARTICULATE POLYMER AND PREPARATION PROCESS THEREOF

[75] Inventors: Teruhiko Sugimori; Fumio Suzuki; Hideaki Habara; Hiromasa Inada, all of Ohtake, Japan

[73] Assignee: Mitsubishi Rayon Company, Ltd., Tokyo, Japan

[21] Appl. No.: 140,670

[22] Filed: Dec. 24, 1987

Related U.S. Application Data

[63] Continuation of Ser. No. 898,018, Aug. 19, 1986, Pat. No. 4,874,841.

[30] Foreign Application Priority Data

Aug. 21, 1985 [JP] Japan ................................ 60-181820
Aug. 30, 1985 [JP] Japan ................................ 60-191399

[51] Int. Cl.$^5$ ................................................ C08J 3/16
[52] U.S. Cl. .................................. 528/497; 528/491; 528/498; 528/500; 523/328; 523/335
[58] Field of Search ................ 528/497, 498, 491, 500

[56] References Cited

U.S. PATENT DOCUMENTS 4,340,723 7/1982 Duyzings ............................ 528/497
4,401,806 8/1983 Hagiwara ............................ 528/498
4,491,658 1/1985 Sugimori ............................ 528/486

FOREIGN PATENT DOCUMENTS 0032769 7/1981 European Pat. Off. .
0057408 8/1982 European Pat. Off. .

Primary Examiner—C. Warren Ivy
Attorney, Agent, or Firm—Oblon, Spivak, McClelland, Maier & Neustadt

[57] ABSTRACT

Disclosed herein is a particulate polymer prepared by the agglomeration of polymer particles contained in a polymer latex. The particulate polymer is composed of primary particles having particle sizes of at least 20 μm and/or secondary particles formed by the agglomeration of at least some of the primary particles and is in the form of a compact mass substantially free of voids. The particulate polymer is prepared by coagulating the polymer latex in the presence of a coagulant and an organic liquid having low solubility in water. The particulate polymer has a high bulk specific gravity and contains few fine particles. It is thus easy to handle and allows the consumption of energy to be reduced in the drying step.

9 Claims, 2 Drawing Sheets

200μm

200μm

100μm

100μm

PARTICULATE POLYMER AND PREPARATION PROCESS THEREOF

This is a continuation of application Ser. No. 06/898,018, filed Aug. 19, 1986 now U.S. Pat. No. 4,874,841.

BACKGROUND OF THE INVENTION (1) Field of the Invention:

This invention relates to a particulate polymer having excellent characteristics as a powder, and more specifically to a particulate polymer obtained by emulsion polymerization, composed of primary particles having particle sizes of at least 20 μm and/or secondary particles formed by agglomeration of at least some of said primary particles and being in the form of a compact mass substantially free of voids.

(2) Description of the Prior Art:

A polymer latex obtained by emulsion polymerization generally contains polymer particles, the sizes of which are not greater than 1 μm, as emulsifiercovered micelles in a state dispersed and floating in water. Since the particle sizes are extremely small, it is difficult to subject the polymer latex directly to solid-liquid separation for the recovery of the polymer. As conventional methods for recovering a polymer from such a latex, it has been widely practiced (1) to separate the polymer directly as particles by using a spray dryer or (2) to mix a salt or acid in the polymer latex to coagulate same and after heating and solidifying the coagulated mixture, to dehydrate and dry the resulting polymer to recover it as particles.

In order to control the sizes of polymer particles to be obtained, it has also been proposed (3) to solidify a polymer latex after dispersing it, as spherical droplets in a specific solvent (Japanese Patent Laid-Open No. 68385/1977), (4) to form a polymer into particles by adding an organic liquid, which has low solubility in water and cannot dissolve the polymer but can wet the polymer, to a slurry obtained as a result of coagulation of a polymer latex (Japanese Patent Publication No. 5610/1984), (5) to mix a polymer latex with an organic liquid, which has low solubility in water and cannot dissolve the polymer but can wet the polymer, in the presence of a coagulant (Japanese Patent Publication No. 5611/1984), and (6) to disperse and semi-coagulate droplets of a polymer latex in a coagulating atmosphere, to solidify the semi-coagulated droplets in a coagulating liquid and then to dehydrate and dry the resultant polymer particles (Japanese Patent Laid-Open No. 95905/1981), etc.

Method (1) which makes use of a spray dryer is however accompanied by the problems that it requires substantial drying energy since a polymer latex containing a great deal of water is dried as is and a large volume of water has to be evaporated and, moreover, that it is difficult to control the size and bulk specific gravity of the particles.

Method (2) featuring coagulation and solidification involves the problems that when a usual tank- or tower-shaped coagulation and solidification apparatus is employed; the resulting polymer particles have a broad particle size distribution and especially contain fine particles of smaller particle sizes in a high proportion. As a result, they have poor handling easiness and have a high water content and hence require enormous drying energy.

In the method (3), it is necessary to process a large amount of a solvent employed in the sphere-forming treatment. In addition, there is potential inconvenience that problems such as fish eyes could occur upon processing of the resultant polymer, because spherical latex droplets are coagulated externally and their coagulation is hence uneven. Although not as much as method (3), method (4) is accompanied by the drawback that it requires an addition of 60–500 parts by weight of an organic liquid per 100 parts by weight of the polymer or at least 200 parts by weight of an organic liquid per 100 parts by weight of the polymer especially when a high bulk specific gravity is desired. It is also necessary to process a large amount of an organic liquid employed. In method (5), it is also necessary to add an organic liquid in an amount 1–5 times the volume of the polymer. There is hence a need to process a large amount of the organic liquid. It is accompanied by another drawback in that it requires large facilities since the concentration of the polymer is low during its processing and treatment. Method (6) permits easy formation of spherical particles because the mechanism of its processing is the same as the spray drying method. It is however accompanied by such shortcomings that a limitation is imposed on the sizes of particles and a large apparatus is required since the coagulation of particles takes place in a vapor phase.

At present, the automation of powder metering is improving and greater storage and transportation facilities are being employed. There is hence a strong demand for the development of particulate polymers which can be handled easily from the viewpoint of the blocking phenomenon, i.e., the caking of particles in the course of storage and the clogging of transportation lines due to insufficient flowability of particles. In order to avoid contamination of working environments with particulate polymers, it is also necessary to form them while minimizing the number of fine particles. When a particulate polymer is used as a mixture with other particles, the particulate polymer is required to have a suitable particle size so that the composition of the mixture is not changed due to separation of the mixture into its components during storage or transportation. There has also been a strong demand to develop a particulate polymer having a large bulk specific density and uniform and suitable particle size so as to permit direct feeding of the resulting particulate polymer to an injection molding machine or calender rolls and hence to omit the pelletizing process.

The present inventors carried out extensive research with a view toward providing solutions to the above-mentioned problems. As a result, it has been found that a particulate polymer capable of attaining this objective can be obtained by coagulating a polymer latex in the presence of a coagulant and an organic liquid having low solubility in water, thereby leading to the present invention.

SUMMARY OF THE INVENTION

An object of this invention is to provide a particulate polymer which is substantially free of fine particles, has excellent flowability and a high bulk specific gravity, is composed of primary particles and/or secondary particles and is in the form of a compact mass substantially free of voids.

Another object of this invention is to provide a process for the preparation of this particulate polymer.

The particulate polymer of this invention is a particulate polymer prepared by the agglomeration of polymer particles contained in a polymer latex, said particulate polymer being composed of primary particles having particle sizes of at least 20 μm and/or secondary particles formed by the agglomeration of at least some of said primary particles and being in the form of a compact mass substantially free of voids.

As the preparation process of this invention for the preparation of this particulate polymer, may be mentioned a process for preparing a particulate polymer by the agglomeration of polymer particles contained in a polymer latex, said particulate polymer being composed of primary particles having particle sizes of at least 20 μm and/or secondary particles formed by the agglomeration of at least some of said primary particles and being in the form of a compact mass substantially free of voids, which comprises coagulating the polymer latex in the presence of a coagulant and an organic liquid having low solubility in water (an organic liquid satisfying this requirement will hereinafter be called "hydrophobic organic liquid").

DETAILED DESCRIPTION OF THE PREFERRED EMBODIMENTS

When a coagulant is added to a polymer latex, it is generally believed that the emulsified state is destroyed and that latex particles (polymer particles), which were contained in the polymer latex, agglomerate in large numbers to form primary particles. It has however been difficult to control the sizes of these primary particles whichever conventional coagulation process is followed. The above-described coagulation methods (1) and (6), each of which utilizes a spraying technique, can solve this problem. A polymer latex is sprayed to coagulate the polymer latex in the form of droplets. The agglomeration of latex particles, which takes place upon coagulation, is hence limited within individual droplets. In other words, the sizes of primary particles are controlled by the sizes of individual droplets. These methods are however unable to form particles of larger particle size, especially, of 500 μm or greater, since there is a limitation to the size of droplet which can be formed by the spraying technique and difficulties are also encountered in causing primary particles to agglomerate further into secondary particles.

In the present invention, a polymer latex, a hydrophobic organic liquid and a coagulant are mixed together to coagulate the polymer latex, unlike in the conventional methods. By stirring the resultant mixture, both the sizes of the primary particles to be formed can be precisely controlled and the sizes of the secondary particles to be formed as a result of agglomeration of these primary particles can also be controlled. It is hence possible to prepare a particulate polymer which has a narrow particle size distribution and a volume average particle size of several tens of micrometers to several millimeters or so directly from a polymer latex.

The particulate polymer of this invention has inter alia the following various features because the particle sizes of the primary particles, which are the principal constituent particles, are as large as at least 20 μm and the particulate polymer is substantially in the form of a compact mass.

Figure 1:
FIG. 1 is a photomicrograph of particles, the size of which range from 150 μm to 212 μm, from particles of the particulate polymer obtained in Example 1.
Figure 2:
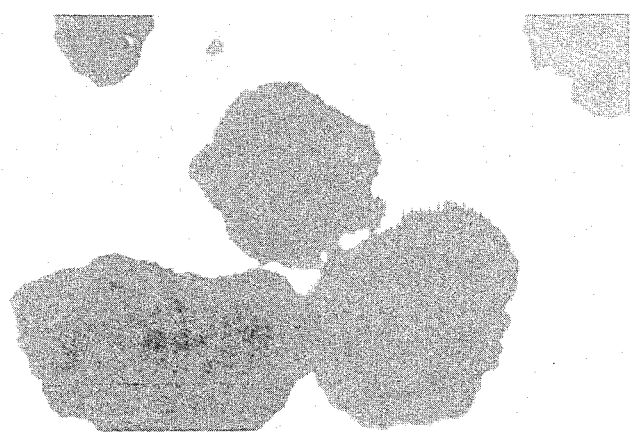
FIG. 2 is a photomicrograph of particles of the particulate polymer obtained in Comparative Example 1.

The first feature is that the particulate polymer is substantially free of fine particles. In a particulate polymer obtained by a conventional coagulation technique, particles look like primary particles at the first glance. As a matter of fact, these particles are secondary particles which have been formed by agglomeration of still finer primary particles usually of 20 μm and smaller into bunches of grapes. This difference is clearly seen when particles of the particulate polymer of this invention and particles of a particulate polymer obtained by a conventional coagulation technique are observed through an optical microscope using transmitted light. FIG. 1 is a photomicrograph of particles, the sizes of which range from 150 μm to 212 μm, from particles of the particulate polymer of this invention obtained in Example 1, which will be described subsequently. FIG. 2 is a photomicrograph of particles of a particulate polymer obtained by a conventional coagulation technique in Comparative Example 1, which will also be described subsequently. The particles of the particulate polymer of this invention are superior in transparency and permit transmission of light therethrough. In the case cf the particulate polymer obtained by the conventional coagulation methods primary particles contained in the particles of the particulate polymer are not in the form of a compact mass and have interfaces. It is hence understood that light is subjected to irregular reflection at interfaces and is not allowed to transmit through the particulate polymer. In particulate. polymers obtained by conventional methods, fine particles are formed of agglomerated secondary particles. By friction among particles in an airborne or fluidized dryer in the course of preparation or by vibration of particles during transportation, the secondary particles are disintegrated into finer primary particles. The primary particles are fine particles and tend to develop the problem that they develop fine particles upon handling and contaminate the environment. In the particulate polymer according to this invention, the particle sizes of primary particles are as large as 20 μm and greater and these primary particles are substantially in the form of a compact mass. They are hence substantially free from the production of fine particles.

The second feature of this invention.is that owing to the substantial elimination of voids, good heat transfer is assured among individual polymer particles. This leads to the advantage that when the particulate polymer is subjected to melt molding in an extruder, the polymer particles can be molten at a high velocity in the extruder, thereby improving the productivity of the extruder. Further, the occurrence of fish eyes due to unmolten polymer is reduced and, when the particulate polymer is employed to produce films or blow-molded articles, their quality can be improved significantly. Even when the particulate polymer is mixed and extruded with another resin having a low melt viscosity, for example, as an additive for vinyl chloride resin, fish eyes are significantly reduced in the resulting products so that the quality of the products is improved.

The third feature is that the particulate polymer has a high bulk specific gravity. Because of this feature, the weight of a particular polymer which can be filled in the same volume is increased, leading to the advantages that its transportation and storage costs can be lowered.

The fourth feature is that the particulate polymer has a sharp particle size distribution. This feature is effective in avoiding separation of a mixture into its components of different particle sizes in a hopper or the like when the particulate polymer is mixed with another particulate material. In other words, when the particle size of the particulate polymer of this invention is brought into conformity with the particle size of a particulate material with which the particulate polymer is mixed, there is the advantage that separation of the mixture into components of different particle sizes due to the difference in particle size between the particulate polymer and, particulate material can be avoided, since the particulate polymer does not contain particles having particle sizes substantially different from the particle sizes of the particulate material to be mixed with.

The particulate polymer having the features described above can be efficiently prepared by coagulating a polymer latex in the presence of a hydrophobic organic liquid and a coagulant as described above. Taking by way of example a process in which the coagulant is added to and mixed with a mixture of the polymer latex and the hydrophobic organic liquid, the following mechanism may be contemplated as the mechanism of production of the particulate polymer of this invention from the polymer latex. The hydrophobic organic liquid which has been mixed in the polymer latex is adsorbed on the surfaces of latex particles or on the surfaces of a polymer in latex particles. When the coagulant is added with stirring under the above-described condition, the emulsified state is destroyed and the latex particles are rendered susceptible to agglomeration. The hydrophobic organic solvent present on the surfaces of the particles serves as a "bridging liquid" and develops attraction between the particles, whereby the particles are formed into larger particles. The mechanism of particle formation, which makes use of this "bridging liquid", is well-known in the fields of sanitary engineering, mining and pharmacy. Its earliest report was made by D. I. Stock et al., which dealt with the formation of fine particles of barium sulfate in benzene [Nature, 4323, 423 (1952)]. This experiment was reproduced by Puddington et al., resulting in elucidation of the formation of particles by a "bridging liquid" [The Canadian Journal of Chemistry, 38, 1911 (1960)]. When this bridging liquid was applied to inorganic particles such as barium sulfate particles, the resultant particles however had porosities at ratios of as high as 0.4–0.5 or so and had a very porous structure even after compaction ["Zairyo", 25 (274), 638 (1976)]. When the process of this invention is relied upon; latex particles remain soft and upon formation of particles, they agglomerate together and grow as primary particles while substantially avoiding the formation of voids. As is apparent from FIGS. 1 and 2, the polymer particles obtained by the conventional coagulation technique are opaque because they are porous. In the case of the process of this invention, it can be seen that the polymer particles are transparent and that the latex particles agglomerate together into a compact mass of greater particles almost without formation of voids.

The mechanism of the formation of particles into larger particles was reported by Mitsuo Usa in "Hyomen", 17, 68 (1979). The mechanism comprises the three steps of (i) perikinetic flocculation, (ii) orthokinetic flocculation and (iii) mechanical syneresis. Among these steps, mechanical syneresis iii) is significant as to the compaction of particles. Usa explained mechanical syneresis as "a process in which a force, which is not uniform from one moment to another, has points of action moving along the passage of time and is applied statistically as a uniform force, forces are applied between particles making up the agglomerates, rearrangement of the particles is caused to occur and the agglomerates are hence compacted, the number of contact points between the particles increase, and the structure of the agglomerates is thus densified". The importance of mechanical syneresis, i.e., shear forces applied to particles to compact them, can be understood from the above explanation by Usa. The importance of mechanical syneresis is believed to be greater in the present invention than in the above-described explanation by Usa, because the present invention induces not only "rearrangement among particles" and "an increased number of contact points between particles" but also the agglomeration of particles into a compact mass.

In the process of this invention for the preparation of a particulate polymer, the above-described mechanical syneresis can be applied by stirring or shaking, i.e., by mixing the mixture of the polymer latex, hydrophobic organic liquid and coagulant. It is also preferred to increase the volume proportions of the polymer in the whole mixture of polymer latex, hydrophobic organic liquid and coagulant above the prescribed values in order to increase the apparent viscosity of the whole mixture and to exert a large shear force on the polymer particles.

Because of the above-described mechanism, the particulate polymer of this invention has extremely good characteristics as a powder. Its primary particles contain almost no voids and its bulk specific density is therefore high. Its particle size distribution is narrow. It can have a desired particle size ranging from several tens of micrometers to several millimeters. Furthermore, it has good flowability and is less susceptible to developing such a phenomenon as blocking.

Any polymer latex can be used to practice of this invention, as long as it has such a solid content that the volume proportion of the polymer in the whole mixture is 3% or higher, preferably, 10% or higher upon coagulation. In particular, a latex of a polymer containing 5–80 wt. % of an elastomer component can be used very effectively. As exemplary elastomer components which can make up the polymer in the polymer latex, are included diene-type elastomers obtained by polymerizing diene-type monomers such as butadiene, isoprene and chloroprene, alkyl acrylate elastomers obtained by polymerizing alkyl acrylate monomers having 3–10 carbon atoms in the alkyl groups such as butyl acrylate, propyl acrylate and octyl acrylate. As specific polymers, may be mentioned acrylonitrile-butadiene-styrene copolymer (ABS resin), methyl methacrylate-butadiene-styrene copolymer (MBS resin), alkyl acrylate-acrylonitrile-styrene copolymers (AAS resin) and alkyl methacrylate-alkyl acrylate copolymers.

The process of this invention for the preparation of a particulate polymer may be classified roughly into two processes in accordance with the properties of the hydrophobic organic liquid employed.

The first process employs, as the hydrophobic organic liquid, an organic liquid which has low solubility in water and does not dissolve the polymer but instead wets the polymer (the organic liquid satisfying these requirements will hereinafter be called "Organic Liquid A").

By contrast, the second process makes use of an organic liquid capable of dissolving at least one polymer (there are n types of polymers when the polymer contained in the polymer latex is composed of n types of monomers) obtained by homopolymerizing individual monomers (only one monomer when the polymer is composed of a single type of monomer) of the polymer contained in the polymer latex (the organic liquid satisfying this requirement will hereinafter be called "Organic Liquid B").

Organic Liquid A which is useful in the practice of the first process of this invention for the preparation of a particulate polymer may be chosen from organic liquids each of which has low solubility in water and does not dissolve the polymer in the polymer latex but instead wets the polymer as described above. The term "wet" as used herein means that the organic liquid sticks only to the surfaces of the polymer and does not penetrate into the polymer, and that the contact angles of the organic liquid stuck on the surfaces of the polymer are about 30° or smaller. As organic liquids satisfying these conditions, may be mentioned those having surface tensions of 35 dyne/cm, or smaller at room temperature. It is possible to use, for example, paraffin-type organic liquids such as hexane and heptane, as well as alicyclic hydrocarbons such as cyclohexane, cycloheptane, methylcyclohexane and methylcycloheptane and their alkyl-substituted derivatives. These Organic Liquids A may be used either singly or in combination.

When the process of this invention for the preparation of the particulate polymer is practiced by using Organic Liquid A, the volume proportions of the polymer and Organic Liquid A in the whole mixture obtained by mixing the polymer latex, Organic Liquid A and coagulant are important parameters.

The volume proportion of the polymer in the whole mixture is 3-25% (I) and preferably ranges from 10-25% especially when a particulate polymer having a high bulk specific gravity of 0.45 g/cm$^3$ or higher is desired. Any volume proportion smaller than 3% results in a reduction in the frequency of collision among polymer particles in the whole mixture, thereby lowering the velocity of particle formation and the velocity of conversion of polymer particles into a compact mass. As a result, the resulting particulate polymer has a lower bulk density. It is hence not desirable to use the polymer in such low volume proportion. On the other hand, any volume proportions in excess of 25%, upon coagulation, leads to the formation of coagulated slurries the viscosities of which are so high that stirring and mixing cannot be effected uniformly. Therefore, coarse particles tend to occur. In addition, such coagulated slurries are difficult to handle. It is hence not desirable to use the polymer in such high volume proportions.

On the other hand, the volume proportion of Organic Liquid A in the whole mixture is 1-30% (II) and preferably ranges from 10-30% especially when a particulate polymer having a high bulk specific gravity of 0.45 g/cm$^3$ or higher is desired. Any volume proportion smaller than 1% results in particulate polymers having low bulk specific gravities and containing fine particles in a high proportion. It is therefore not desirable to use Organic Liquid A in such low volume proportions. On the other hand, any volume proportions greater than 30% leads to abundant formation of coarse particles having particle sizes of 4 mm or greater. In spite of the use of Organic Liquid A in an increased amount, the bulk specific gravity does not increase. It is hence not preferred to use Organic Liquid A in such high volume proportions.

By satisfying a further requirement (III) that the volume proportion of Organic Liquid A relative to the volume of the polymer be 200% or less (III), in addition to the above described requirements (I) and (II) that the volume proportion of the polymer in the whole mixture is 3-25% (I) and that the volume proportion of Organic Liquid A in the whole mixture be 1-30% (II), it is possible to obtain a particulate polymer having a low water content and a high bulk specific gravity without the formation of coarse particles. This practice is also preferable because it allows that Organic Liquid A to be used in a small amount and thereby reducing the production cost.

Organic Liquid B which is useful in the practice of the second process of this invention for the preparation of a particulate polymer has low solubility in water and dissolve at least one homopolymer of the individual monomers constituting the polymer contained in the polymer latex. It is preferable that Organic Liquid B can dissolve the polymer, which is contained in the polymer latex. As to its solubility in water, it is desirable to use Organic Liquid B, the solubility of which is at most about 0.1 wt. % (at 10° C.). If the solubility of the organic liquid in water is high, the polymer in the latex does not form particles but is extracted by the organic liquid and is eventually separated into three layers of (a) the organic liquid layer containing the polymer, (b) water containing unextracted latex and (c) a mixed layer of the organic liquid and water, or two layers of (a) and (b) above. If the solubility of the organic liquid in water is high, it is necessary to separate the organic liquid from a great deal of water and then to treat the thus-separated organic liquid after the formation of polymer particles from the polymer latex by the coagulation and particle-forming technique. Such high solubility is therefore not appropriate. Organic Liquid B is required to dissolve at least one homopolymer of the individual monomers constituting the polymer contained in the polymer latex. Preferably, it dissolves the polymer, which is contained in the polymer latex. By using Organic Liquid B, the desired primary particles can be formed. Illustrative examples of Organic Liquid B include aromatic hydrocarbons such as benzene, toluene and xylene and their alkyl-substituted derivatives, halogenated hydrocarbons such as chloroform, carbon tetrachloride and ethylene chloride, isobutyl ketone and the like. They may be used either singly or in combination.

Organic Liquid B has a major influence on the formation of particles. It may be used in an mount of 3-40 parts by weight per 100 parts by weight of the solids of the polymer contained in the polymer latex. If the proportion of Organic Liquid B is smaller than 3:parts by weight, fine particles having smaller particle sizes are obtained as in the conventional processes. This is certainly not desirable. On the other hand, any proportion greater than 40 parts by weight causes coagulated polymer particles to agglomerate into a highly-viscous mass. It is hence not desirable to use Organic Liquid B in such high proportions.

Particles having a very uniform particle size distribution can be obtained over a wide range of particle sizes by varying the amount of Organic Liquid B to be mixed and added. It is especially worth noting that polymer particles having particle sizes of several millimeters can be formed although such large particles have been difficult to obtain to date.

No particular limitation is imposed on the type of polymer latex to which the preparation process making use of Organic Liquid B is applied. The above-described polymer latex may thus be employed. Its solid content may suitably range from 5–60 wt. %, with the range of 10–60 wt. % being preferred. If the solid content is lower than 5 wt. %, there is less chance of polymer particles colliding with each other with the result that the compaction of agglomerated particles cannot be achieved sufficiently, the bulk specific density is lowered and the water content increases. If the solid content exceeds 60 wt. % on the other hand, the viscosity of the slurry increases significantly immediately after the addition of the coagulant, whereby stirring becomes no longer feasible and particles having a uniform particle size are difficult to obtain.

Since the solid content of a polymer latex is generally chosen in view of its productivity in the polymerization step, the properties of the polymer, etc., it is recommended that the solid content of the polymer latex be adjusted by adding water to the polymer latex prior to coagulation so that desirable powder properties and handling ease can be brought about.

As the coagulant useful in the practice of be used. There are, for example, inorganic salts coagulant may (calcium chloride, sodium chloride, sodium sulfate, aluminum sulfate, zinc sulfate, sodium carbonate, ammonium chloride, potash alum, etc.), mineral acids (sulfuric acid, hydrochloric acid, phosphoric acid, nitric acid, carbonic acid, etc.) and organic acids (acetic acid, etc.). They may be used either singly or in combination. No particular limitation is imposed on the amount of the coagulant to be used. The amount varies depending on the type of each polymer latex and the type of coagulant. It should be used in an amount sufficient to coagulate each polymer latex.

Upon practice of this invention, a hydrophobic organic liquid and the coagulant may be simultaneously added and mixed with the polymer latex so as to coagulate the polymer latex. It is however preferred to first add the hydrophobic organic liquid to the polymer latex and to stir the resultant mixture thoroughly and then add and mix the coagulant with the mixture for coagulation. This manner is preferable because it provides a particulate polymer having a bulk specific gravity of 0.45 g/cm$^3$ or higher.

It is desirable that the polymer latex, hydrophobic organic liquid and coagulant be uniformly mixed in their mixture. In particular, the particle size distribution of the resulting particulate polymer can be made narrower as the dispersion of the hydrophobic organic solvent becomes more even. It is hence preferred to disperse the hydrophobic liquid uniformly in the polymer latex by stirring or the like. Here, care must be paid to avoid destruction of the emulsified state of the polymer latex by the mechanical shear forces applied by stirring. As the dispersing apparatus for achieving this object, a tank type mixer, Cowles mixer. static mixer, usual centrifugal pump or the like may be used. In order to ensure the uniform dispersion of the hydrophobic organic liquid, it is also possible to mix the hydrophobic organic liquid, a dispersant and water so as to disperse the hydrophobic organic liquid in the water in advance and then to add and mix the aqueous dispersion with the polymer latex. The addition of a dispersant is also preferable from the viewpoint of increasing the stability of coagulated polymer particles in the dispersion and avoiding unnecessary secondary coagulation. The time required for the mixing and dispersion of the hydrophobic organic liquid in the polymer latex may vary depending on the amount of latex and the apparatus to be used. Usually, several seconds to several minutes are sufficient.

The coagulant is thereafter added to and mixed with the polymer latex in which the hydrophobic organic liquid has been dispersed. The stirring which is effected upon this addition and mixing of the coagulant is also important because it has a significant effect on the formation of particles upon coagulation. Since the viscosity of the coagulated slurry increases temporarily immediately after the addition of the coagulant, it is particularly important to stir the coagulated slurry evenly in its entirety. As a mixer for achieving this purpose, it is possible to use an ordinal tank type reactor in combination with a turbine blade, sweptback wing, baffle plates or the like, or an in-line mixer such as a Choles mixer. The velocity of coagulation and particle formation is very fast and can generally be completed in several seconds to 1 minute or so.

Polymer particles which have been obtained by subjecting the polymer latex to coagulation and particle formation in the above manner are then heated to a temperature above the glass transition point of the polymer, thereby densifying and solidifying the particles further. This is usually carried out by raising the temperature of the coagulated slurry in which polymer particles are contained. During this heating, the formation of particles may in some instances proceed further to form coarse particles. This phenomenon tends to occur especially when a mineral acid or the like is used as the coagulant. If this should happen, it is preferable to raise the temperature of the slurry and to solidify it after adjusting the pH of the slurry to 2–5, preferably to 3–5, because the particle formation is suppressed and the occurrence of coarse particles is reduced, thereby making it easier to obtain particles having uniform particle size.

Further, it is desirable to evaporate the hydrophobic organic liquid, which is dispersed in polymer particles or in the dispersing medium of the coagulated slurry, so as to remove it from the polymer particles upon soldification. If the boiling point of the organic liquid is 100° C. or lower, the organic liquid can be easily removed by heating the coagulated slurry to a temperature above its boiling point but below 100° C. when solidification is effected. If the boiling point of the organic liquid is higher than 100° C., steam may be blown into the coagulated slurry of about 100° C. so that the organic liquid can be removed along with the steam. In both cases, the quantity of heat required for the evaporation of the organic liquid is small because the organic liquid is used in a small amount in the present invention. Since the organic liquid has low solubility in water, the waste water contains practically no organic liquid and its treatment can be simplified significantly. Accordingly, the overall process is very economical.

The present invention will hereinafter be described specifically by the following Examples.

EXAMPLE 1:

In a glass cylindrical coagulation tank equipped with an anchor-like stirring blade and having an internal diameter of about 15 cm and a depth of about 23 cm, a copolymer latex (solid content: 27.8 wt. %) of methyl methacrylate (85 wt. %) and butyl acrylate (15 wt. %) was placed to give the volume proportion shown in Table 1. Stirring was started at about 500 rpm. Hexane was then added to achieve the volume proportion shown in Table 1. The contents are stirred for 1 minute to mix and disperse hexane in the copolymer latex. Thereafter, an aqueous solution of sulfuric acid was added as a coagulant in an amount equivalent to 1 g $H_2SO_4$ per 100 g of the copolymer.

As soon as the aqueous solution of sulfuric acid was poured, the mixture of the polymer latex, water and hexane, the volume of which had been increased because of foaming caused by stirring, was rapidly reduced in volume and in several seconds, its volume was reduced to approximately its initial volume. The viscosity of the coagulated slurry increased correspondingly. However, the viscosity of the coagulated slurry dropped when stirring was continued further. It took about 10–30 seconds until the viscosity became substantially constant after completion of the addition of the aqueous solution of sulfuric acid.

Stirring was continued further for 1 minute, and the coagulated slurry which contained coagulated polymer particles was poured with stirring into 5 l of warm water of 65° C. filled in a solidification apparatus of the mixing-tank type having a capacity of 20 l. Steam was blown into the solidification apparatus from the initiation of pouring in order to control the temperature of the warm water within the range of 60° C.–65° C. After completion of pouring of the whole coagulated slurry in the solidification apparatus, steam was continuously blown into the solidification apparatus while stirring the contents so that the temperature of the coagulated slurry was raised to 100° C. in about 3–5 minutes. After maintaining the coagulated slurry at the same temperature for 1 minute, it was taken out of the solidification apparatus and subjected to solid-liquid separation, cooling, washing, dehydrating and drying, whereby a particulate polymer was obtained.

The photomicrograph of the particles, the sizes of which ranges from 150 $\mu$m to 212 $\mu$m, from the particles of the resulting particulate polymer is shown in FIG. 1.

The bulk specific density of the thus-obtained particulate polymer was determined by the procedure described in section 3.3 of JIS K-6721. In this procedure approximately 120 ml of a well mixed particulate polymer sample is placed in funnel 1 shown in the apparatus of FIG. 5. The funnel is provided with a damper at its base. The funnel is made of stainless plate 1 mm thick, and has a cylindrical chute 5, which has an inside diameter of 8 mm, positioned at its base immediately over the damper 3. Upon opening of the damper 3, the sample falls into receiver 7 which has an inside diameter of 40 mm and is of a depth of 8 cm. The receiver is made of stainless steel plate 1 mm thick and has an inner volume of 100 ml. After the sample in the receiver 7 is leveled with a glass rod, the mass of the receiver is weighed to within 0.1 gram. The bulk specific gravity of the weighed sample is then determined to two decimal places using the equation:

$$Sa = C - A/B,$$

wherein Sa is the bulk specific gravity, A is the mass of the receiver (g), B is the inner volume of the receiver (ml) and C is the mass of the receiver containing the sample (g).

The states of the various particulate polymer samples of in this and the following examples, as the samples flow from the funnel into the receiver upon opening of the damper, were identified and fall into one of the three categories defined as follows.

○: Sample flowed out naturally upon removal of the damper.

X: Sample flowed-out when the gravimeter was subjected to continuous impacting.

XX: Sample did not flow out even when the gravimeter was subjected to continuous impacting.

These testing methods were also applied to the following Examples and Comparative Examples. The measurement results are shown in Table 1. A good particulate polymer having a high bulk specific density and containing few fine particles of 45 $\mu$m and smaller was obtained.

EXAMPLE 2-5:

By using the same copolymer latex used in Example 1, particulate polymers were obtained in the same manner as in Example 1 except that the organic liquids shown in Table 1 were each employed as Organic Liquids A and the copolymer latex and organic liquids were used in the corresponding volume proportions given in Table 1. In each Example, the resultant particulate polymer had a high bulk specific gravity, contained fine particles in a very small amount and showed good flowability. A particulate polymer having a significantly high bulk specific gravity and a very narrow particle-size distribution was obtained in particular in Example 5.

COMPARATIVE EXAMPLE 1

After pouring 360 g of the same copolymer latex used in Example 1 into 3 l of a 0.1% aqueous. solution of sulfuric acid of 50° C. and coagulating the copolymer latex, steam was blown into the resultant coagulated slurry to heat it to 98° C. and the polymer was recovered. The physical properties of the thus-obtained polymer were measured and the results are given in Table 1. The bulk specific gravity of the polymer particles was low. The polymer contained fine particles in a high proportion. The particle size distribution was broad and the flowability was very poor.

A photomicrograph showing the structure of the thus-obtained polymer particles is shown in FIG. 2.

COMPARATIVE EXAMPLE 2:

Under the conditions given in Table 1, a particulate polymer was obtained in the same manner as in Example 1. Its physical properties were measured and the results are given in Table 1. Although the volume proportion of the organic liquid in the whole mixture was equal to that of Example 8, the bulk specific gravity was low and fine particles were contained in a high proportion because the volume proportion of the polymer was outside the range specified by the present invention.

COMPARATIVE EXAMPLE 3:

Under the conditions given in Table 1, a particulate polymer was obtained in the same manner as in Example 1. Its physical properties were measured and the results are shown in Table 1. Although the volume proportion of the organic liquid in the whole mixture was equal to that of Example 7, coarse particles were formed because the volume proportion of the polymer was too high.

COMPARATIVE EXAMPLE 4:

Under the conditions given in Table 1, a particulate polymer was obtained in the same manner as in Example 1. Its physical properties were measured and the results are shown in Table 1. Since the volume proportion of the organic liquid was too high, many coarse particles were formed although the bulk specific gravity was similar to that of Example 5.

EXAMPLE 6–8:

The same copolymer latex used in Example 1 was added to glass containers of the same type used in Example 1 to give the volume proportions given in Table 1. Stirring was started at about 700 rpm. Thereafter, hexane was added to give the volume proportions shown in Table 1. The resultant mixtures were separately stirred for 5 minutes in order to mix and disperse them. The resulting dispersions were separately treated in the same manner as in Example 1 to obtain particulate polymers. The properties of the particulate polymers are shown in Table 1. They had high bulk specific gravities and contained fine particles of 45 μm and smaller in small amounts. They were hence good particulate polymers.

the results are shown in Table 2.. It can be seen that the mixture with the particulate polymer of Example 3 incorporated therein developed fewer fish eyes.

TABLE 2

|   | Sheet-like material compounded with the particulate polymer of Example 3 | Sheet-like material compounded with the particulate polymer of Comp. Ex. 1 | Sheet-like material of hard vinyl chloride resin compound only |
|---|---|---|---|
| Number of fish eyes formed in sheet-like material of 60 mm wide and 100 mm long (average of three measurements) | 18 | 25 | 28 |

EXAMPLES 9–10:

After mixing a copolymer latex, which had been obtained by graft polymerizing 20 parts by weight of methyl methacrylate and 20 parts by weight of styrene on 60 parts by weight of polybutadiene, with Organic Liquid A in the proportions given in Table 3, the resultant mixtures were separately treated in the same manner as in Example 6 to obtain particulate polymers.

The properties of the thus-obtained particulate polymers are shown in Table 3. A photomicrograph of the

TABLE 1

|  | Example | | | | | | | | Comparative Example | | | |
|---|---|---|---|---|---|---|---|---|---|---|---|---|
|  | 1 | 2 | 3 | 4 | 5 | 6 | 7 | 8 | 1 | 2 | 3 | 4 |
| Volume of whole mixture (cc) | 696 | 696 | 696 | 466 | 612 | 3600 | 3600 | 3600 | — | 3600 | 3600 | 654 |
| Kind of Organic Liquid A | Hexane | Heptane | Hexane | Hexane | Hexane | Hexane | Hexane | Hexane | None | Hexane | Hexane | Hexane |
| Volume proportion of polymer in whole mixture (%) | 14.4 | 14.4 | 14.4 | 21.5 | 16.4 | 5 | 20 | 20 | — | 2.5 | 28 | 15.2 |
| Volume proportion of Organic Liquid A in whole mixture (%) | 17.4 | 17.0 | 13.1 | 16.3 | 24.8 | 5 | 5 | 2.5 | — | 2.5 | 5 | 33.8 |
| Amount of sulfuric acid (g/100 g polymer) | 1 | 1 | 1 | 1 | 1 | 1 | 1 | 1 | — | 1 | 1 | 1 |
| Flowability | ○ | ○ | ○ | ○ | ○ | ○ | ○ | ○ | XX | X | X | X |
| Bulk specific gravity (g/cm$^3$) | 0.47 | 0.46 | 0.46 | 0.48 | 0.54 | 0.35 | 0.37 | 0.36 | 0.23 | 0.17 | 0.41 | 0.53 |
| Water content of wet powder after centrifugal dehydration (%, dry basis) | 32 | 30 | 32 | 22 | 33 | 23 | 20 | 0 | 106 | 28 | 20 | 28 |
| Particle size distribution | | | | | | | | | | | | |
| Greater than 2 mm | 0 | 0 | 0 | 0.5 | 1.0 | 1.3 | 2.2 | 1.1 | 6.0 | 20.8 | 35.1 | 34.5 |
| 2 mm–1.4 mm | 0.9 | 0.3 | 0.3 | 0.8 | 2.1 | 1.6 | 2.1 | 2.0 | 7.9 | 9.5 | 16.5 | 18.8 |
| 1.4 μm–500 μm | 36.4 | 2.5 | 3.9 | 15.4 | 92.6 | 8.3 | 11.0 | 10.8 | 8.5 | 26.7 | 25.2 | 37.9 |
| 500 μm–212 μm | 53.9 | 21.4 | 27.3 | 24.7 | 3.0 | 18.9 | 27.7 | 18.1 | 6.2 | 20.6 | 10.5 | 7.3 |
| 212 μm–106 μm | 8.6 | 45.8 | 52.2 | 27.5 | 1.2 | 42.8 | 32.2 | 29.3 | 9.2 | 13.6 | 7.1 | 0.8 |
| 106 μm–45 μm | 0.2 | 27.4 | 16.0 | 29.8 | 0.1 | 24.6 | 22.1 | 35.1 | 32.8 | 8.0 | 4.3 | 0.7 |
| Smaller than 45 μm | 0 | 2.6 | 0.3 | 1.3 | 0 | 2.5 | 2.7 | 3.6 | 29.3 | 0.8 | 1.3 | 0 |

Figure 3:
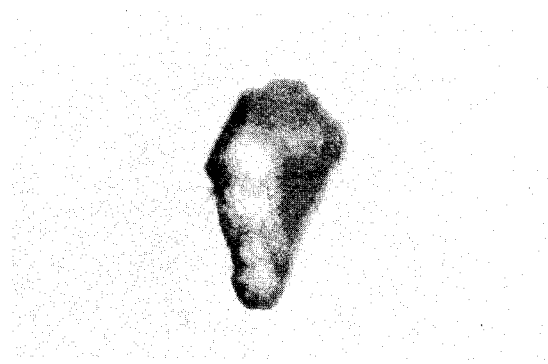
FIG. 3 is a photomicrograph of particles, the sizes of which range from 75 μm to 106 μm, from particles of the particulate polymer obtained in Example 9.

REFERENTIAL EXAMPLE:

From each of the particulate polymers obtained in Example 3 and Comparative Example 1, 10 parts by weight of polymer particles having particle sizes of from 106 [2 m to 212 μm were added to 90 parts by weight of a hard vinyl chloride resin compound with a tin-base stabilizer compounded therein. Therefore, two types of mixtures were obtained. These mixtures and the hard vinyl chloride resin compound were separately molded into sheet-like materials 0.5 mm thick and 70 mm wide by means of a single screw extruder and a sheet die of the fish-tail type. The number of fish eyes developed on the sheet-like materials was measured and particles, the sizes of which range from 75 μm to 106 μm, from the particles of the particulate polymer obtained in Example 9 is shown in FIG. 3.

COMPARATIVE EXAMPLE 5:

Using the same copolymer latex used in Example 9, a coagulated powder was obtained by conducting treatments similar to those effected in Comparative Example 1. The properties of the resultant coagulated powder are also shown in Table 3.

TABLE 3

|  | Example | | Comp. Ex. |
|---|---|---|---|
|  | 9 | 10 | 5 |
| Volume of whole mixture (cc) | 1200 | 1800 | — |
| Kind of Organic Liquid A | Hexane | Hexane | Not added |
| Volume proportion of polymer in whole mixture (%) | 18 | 10 | — |
| Volume proportion of Organic Liquid A in whole mixture (%) | 12 | 9 | — |
| Amount of sulfuric acid (g/100 g polymer) | 1 | 1 | 1 |
| Flowability | O | O | X |
| Bulk specific gravity (g/cm$^3$) | 0.38 | 0.4 | 0.33 |
| Water content of wet powder after centrifugal dehydration (%, dry basis) | 34 | 37 | 53 |
| Particle size distribution | | | |
| Greater than 2 mm | 2.3 | 4.7 | 0 |
| 2 mm–1.4 mm | 12.5 | 17.6 | 0 |
| 1.4 mm–500 μm | 40.1 | 48.8 | 0.7 |
| 500 μm–212 μm | 29.0 | 22.5 | 21.6 |
| 212 μm–106 μm | 10.3 | 5.5 | 42.1 |
| 106 μm–45 μm | 4.9 | 0.9 | 26.4 |
| Smaller than 45 μm | 0.9 | 0 | 9.2 |

Example 11:

Using the same coagulation tank and copolymer latex employed in Example 1, 360 g of the copolymer latex was placed. Stirring was started at about 500 rpm. As Organic Liquid B, 10 g of toluene was then added. The contents were stirred for 5 minutes to mix and disperse hexane in the copolymer latex. Thereafter, 328 g of additional water was added to the coagulation tank and, immediately after the addition of the additional water, 33 g of a 3 wt. % aqueous solution of sulfuric acid was added as a coagulant.

After the aqueous solution of sulfuric acid was poured, the mixture of the polymer latex, water and hexane the volume of which had been increased because of foaming caused by stirring, was rapidly reduced substantially to its initial volume in several seconds. The viscosity of the coagulated slurry increased correspondingly. However, the viscosity of the coagulated slurry dropped when stirring was continued further. It took about 10–30 seconds until the viscosity became substantially constant after completion of the addition of the aqueous solution of sulfuric acid.

After stirring for 1 minute, the slurry which contained coagulated polymer particles was poured with stirring into 5 l of warm water of 65° C. filled in a solidification apparatus of the mixing tank type having a capacity of 20 l. Steam was blown into the solidification apparatus from the initiation of the pouring to control the temperature of the warm water within the range of 60° C.–65° C. After completion of pouring of the whole slurry in the solidification apparatus, steam was continuously blown into the solidification apparatus while stirring the contents so that the temperature of the coagulated slurry was raised to 100° C. in about 3–5 minutes. After maintaining the coagulated slurry at the same temperature for 1 minute, it was taken out of the solidification apparatus and subjected to solid-liquid separation, cooling, washing, dehydrating and drying, whereby a particulate polymer was obtained.

The physical properties of the thus-obtained particulate polymer were measured in the same manner as in Example 1 and the results are shown in Table 4. It should be noted that toluene can dissolve both polymethyl methacrylate and polybutyl acrylate which are homopolymers of individual monomer components.

Figure 4:
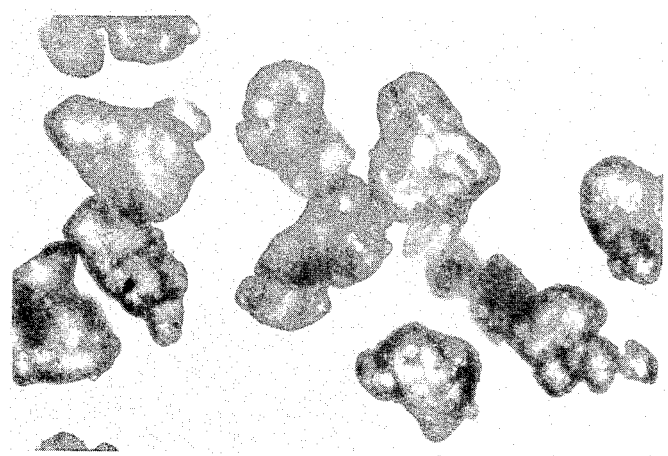
FIG. 4 is a photomicrograph of particles, the particle sizes of which range from 37 μm to 63 μm, from particles of the particulate polymer obtained in Example 11.

A photomicrograph of the particles, the sizes of which range from 37 μm to 63 μm, from the particles of the resulting particulate polymer is shown in FIG. 4.

EXAMPLES 12–14:

The coagulation of the copolymer latex was carried out in exactly the same manner as in Example 11 except that the amount of toluene employed were varied as shown in Table 4. Although the size of the particulate polymers varied as shown in Table 4, each particulate polymer showed good flowability.

COMPARATIVE EXAMPLE 6:

Coagulation of the copolymer latex was conducted in exactly the same manner as in Example 11 except that toluene was not used. The results are shown in Table 4. The resulting particulate polymer contained many fine particles and its flowability was very poor.

EXAMPLE 15:

A 5 wt. % aqueous solution of sodium hydroxide was added to the slurry obtained by conducting coagulation and particle formation in exactly the same manner as in Example 11, thereby raising the pH of the slurry to 3.5. The slurry was then solidified in the same manner as in Example 11. The results are shown in Table 4. The resulting particulate polymer had more uniform particle sizes than that obtained in Example 11.

EXAMPLE 16:

Coagulation of the copolymer latex was effected in the same manner as in Example 11. except that benzene was used as Organic Liquid B. The results are shown in Table 4.

It should be noted that benzene can dissolve polymethyl methacrylate but not polybutyl acrylate.

EXAMPLE 17:

A latex (solid content: 33%) of a copolymer composed of 15 wt. % of butadiene, 65 wt. % of styrene and 20 wt. % of acrylonitrile was coagulated in the same manner as in Example 11. The results are shown in Table 4.

It should be noted that toluene can dissolve polystyrene, can partly dissolve polybutadiene and cannot dissolve polyacrylonitrile, which are homopolymers of the monomer components.

COMPARATIVE EXAMPLE 7:

Coagulation of a copolymer latex was carried out in exactly the same manner as in Example 17 except that toluene was not used. The results are shown in Table 4.

The thus-obtained particulate polymer contained fine particles in a large proportion and had poor flowability.

TABLE 4

|  | Example | | | | Comp. Ex. |
|---|---|---|---|---|---|
|  | 11 | 12 | 13 | 14 | 6 |
| Amount of latex (g) | 360 | 360 | 360 | 360 | 360 |

TABLE 4-continued

| | | | | | |
|---|---|---|---|---|---|
| Kind of Organic Liquid B | Toluene | Toluene | Toluene | Toluene | — |
| Amount of Organic Liquid B (g) | 10 | 20 | 25 | 5 | — |
| Dispersing time (minutes) | 5 | 5 | 5 | 5 | 5 |
| Amount of additional water (g) | 328 | 328 | 328 | 328 | 328 |
| Amount of 3 wt. % aqueous solution of sulfuric acid (g) | 33 | 33 | 33 | 33 | 33 |
| Particle formation time (minutes) | 1 | 1 | 1 | 1 | 1 |
| Solidifying temperature (°C.) | 100 | 100 | 100 | 100 | 100 |
| Flowability | O | O | O | O | XX |
| Bulk specific gravity (g/cm$^3$) | 0.53 | 0.45 | 0.41 | 0.40 | 0.23 |
| Particle size distribution | | | | | |
| Greater than 2 mm | 0 | 3.2 | 18.3 | 0 | 6.0 |
| 2 mm–1.4 mm | 0.3 | 13.5 | 27.4 | 0 | 7.9 |
| 1.4 mm–850 μm | 1.2 | 18.3 | 30.5 | 0 | 5.1 |
| 850 μm–500 μm | 22.6 | 25.4 | 15.4 | 0 | 3.4 |
| 500 μm–250 μm | 40.8 | 28.5 | 8.3 | 34.5 | 6.2 |
| 250 μm–106 μm | 24.0 | 10.7 | 0.1 | 34.0 | 9.2 |
| 106 μm–45 μm | 10.6 | 0.3 | 0 | 23.4 | 32.8 |
| Smaller than 45 μm | 0.5 | 0.1 | 0 | 8.1 | 29.4 |

| | Example | | | Comp. Ex. |
|---|---|---|---|---|
| | 15 | 16 | 17 | 7 |
| Amount of latex (g) | 360 | 360 | 300 | 300 |
| Kind of Organic Liquid B | Toluene | Benzene | Toluene | — |
| Amount of Organic Liquid B (g) | 10 | 10 | 10 | — |
| Dispersing time (minutes) | 5 | 5 | 5 | — |
| Amount of additional water (g) | 328 | 328 | 388 | 388 |
| Amount of 3 wt. % aqueous solution of sulfuric acid (g) | 33 | 33 | 33 | 33 |
| Particle formation time (minutes) | 1 | 1 | 1 | 1 |
| Solidifying temperature (°C.) | 100 | 100 | 100 | 100 |
| Flowability | O | O | O | XX |
| Bulk specific gravity (g/cm$^3$) | 0.52 | 0.45 | 0.41 | 0.29 |
| Particle size distribution | | | | |
| Greater than 2 mm | 0 | 0 | 0 | 0.1 |
| 2 mm–1.4 mm | 0 | 0 | 0.1 | 0.5 |
| 1.4 mm–850 μm | 0.5 | 0.7 | 2.3 | 3.2 |
| 850 μm–500 μm | 23.2 | 13.2 | 18.5 | 12.4 |
| 500 μm–250 μm | 41.5 | 35.4 | 32.2 | 16.0 |
| 250 μm–106 μm | 22.5 | 37.3 | 29.3 | 25.1 |
| 106 μm–45 μm | 11.7 | 11.8 | 14.8 | 32.6 |
| Smaller than 45 μm | 0.6 | 1.6 | 2.8 | 10.1 |

According to the process of this invention, latex particles are agglomerated into a compact mass to provide a particulate polymer which is substantially free of voids and is formed of primary particles and/or secondary particles formed by agglomeration of at least some of the primary particles. Accordingly, the particulate polymer does not form fine particles even in its dehydrating, washing and drying steps, and has excellent flowability and a high bulk specific gravity. The particulate polymer develops almost no problems such as the blocking phenomenon during storage, clogging of its transportation line etc., thereby permitting simplification and enlargement of storage and transportation facilities. Since the particulate polymer has a bulk specific gravity and contains fine particles in small proportions only, the dehydrating property of its slurry is good. It is therefore possible to lower the content of water in a wet powder obtained by a method such as centrifugal dehydration to 50% or less compared with conventional wet powders. Its heat consumption can thus be reduced significantly in the drying step. Since an organic liquid having low solubility in water is employed, almost no organic liquid is practically contained in the waste water and the treatment of the waste water can be greatly simplified. In addition, the particulate polymer can be fed directly to an injection molding machine even when the pelletizing step is omitted.

We claim:

1. A process for preparing a particulate polymer by the agglomeration of polymer particles contained in a polymer latex obtained by emulsion polymerization, said polymer being a 5–80 weight percent elastomer-containing copolymer, said particulate polymer being composed of primary particles and/or secondary particles, said primary particles being in the form of a compact mass substantially free of voids and having particles sizes of at least 20 μm, and said secondary particles being formed by the agglomeration of at least some of said primary particles, which comprises the steps of:
    mixing the polymer latex and an organic liquid having low solubility in water, which is incapable of dissolving the polymer but being capable of wetting the polymer in amounts such that the volume proportion of organic liquid to polymer ranges from 0.124 to 0.759 followed by;
    adding a coagulant to the resultant mixture in an amount sufficient to coagulate the polymer latex thereby forming said polymer particles;
    stirring or shaking the resulting mixture; and
    solidifying and densifying the polymer particles obtained by heating the polymer particles to a temperature above the glass transition point of the polymer.

2. The process as claimed in claim 1, wherein said organic liquid is a member selected from the group consisting of paraffin liquids, alicyclic hydrocarbons and alkyl substituted derivatives thereof.

3. The process as claimed in claim 1, wherein the bulk specific gravity of the particulate polymer measured in accordance with JIS K-6721 is 0.45 g/cm$^3$ or higher.

4. The process as claimed in claim 1, wherein said elastomer component is a diene based polymer or a $C_{3-10}$ alkyl acrylate base polymer.

5. The process as claimed in claim 1, wherein said organic liquid has a boiling point of up to 100° C. and said coagulated polymer particles are solidified by heating the polymer particles to a temperature above the glass transition point of the polymer and above the boiling point of the organic liquid but below 100° C., thereby causing the organic liquid to evaporate from the polymer particles.

6. The process as claimed in claim 1, wherein said organic liquid has a boiling point of at least 100° C. and wherein steam is blown into the medium containing coagulated polymer particles, thereby heating the polymer particles to a temperature above the glass transition point of the polymer and at the same time causing evaporation of the organic liquid together with the steam which aids in the removal of organic liquid.

7. The process as claimed in claim 2, wherein the pH of the medium containing coagulated polymer particles as a slurry is adjusted to within the range of 2-5 and the polymer particles are heated a temperature above the glass transition point of the polymer.

8. A particulate polymer prepared by the process of claim 1.

9. A particulate polymer as claimed in claim 8, wherein the bulk specific gravity of the particulate polymer measured in accordance with JIS K-6721 is 0.45 g/cm$^3$ or higher.

* * * * *